(12) United States Patent
Yamada et al.

(10) Patent No.: US 7,135,504 B2
(45) Date of Patent: Nov. 14, 2006

(54) INK COMPOSITION FOR ULTRAVIOLET CURABLE INK-JET RECORDING

(75) Inventors: Yutaka Yamada, Saitama (JP); Hisao Yamaguchi, Ageo (JP); Osamu Oshima, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/510,717

(22) PCT Filed: Apr. 25, 2003

(86) PCT No.: PCT/JP03/05363

§ 371 (c)(1),
(2), (4) Date: Oct. 18, 2004

(87) PCT Pub. No.: WO03/093377

PCT Pub. Date: Nov. 13, 2003

(65) Prior Publication Data

US 2005/0119363 A1    Jun. 2, 2005

(30) Foreign Application Priority Data

Apr. 30, 2002  (JP)  .......................... 2002-128296

(51) Int. Cl.
| | |
|---|---|
| *C08F 2/46* | (2006.01) |
| *B32B 9/00* | (2006.01) |
| *C09D 11/02* | (2006.01) |
| *C09D 4/00* | (2006.01) |

(52) U.S. Cl. .......................... 522/71; 522/81; 522/182; 522/113; 522/96; 522/90; 428/403; 428/407; 427/212; 252/182.22; 252/182.23; 252/182.33; 252/183.13; 106/31.27; 106/31.28; 106/31.33; 106/31.45; 106/31.46

(58) Field of Classification Search ................. 522/71, 522/182, 113, 96, 90; 428/407, 403; 427/212; 252/182.22, 182.23, 182.33, 183.13; 106/31.27, 106/31.28, 31.33, 31.45, 31.46
See application file for complete search history.

(56) References Cited

FOREIGN PATENT DOCUMENTS

| | | | |
|---|---|---|---|
| JP | 2001-207098 | * | 7/2001 |
| JP | 2001-525479 | | 12/2001 |
| WO | 99/29787 A2 | | 6/1999 |

* cited by examiner

*Primary Examiner*—Sanza L. McClendon
(74) *Attorney, Agent, or Firm*—Armstrong, Kratz, Quintos, Hanson & Brooks, LLP

(57) ABSTRACT

An ink composition for ultraviolet curable ink-jet recording including carbon black, a photopolymerizable compound and a photopolymerization initiator, comprising at least one selected from the group consisting of non-metallic phthalocyanine sulfonic acids, metal phthalocyanine sulfonic acids in which the central metal is Cu, Fe, Ni, Co, or Ti, and metal salts thereof, and a polymer dispersant containing a basic functional group. The photopolymerizable compound may dissolve the polymer dispersant.

12 Claims, No Drawings

INK COMPOSITION FOR ULTRAVIOLET CURABLE INK-JET RECORDING

TECHNICAL FIELD

The present invention relates to an ultraviolet curable ink for ink-jet recording, and more specifically to an ink composition for ultraviolet curable ink-jet recording that uses carbon black as a coloring material, and displays excellent dispersion stability and discharge stability.

BACKGROUND ART

Printing with an ink-jet recording system involves discharging ink from a nozzle, and bonding that ink to a recording target material, and because the nozzle does not contact the recording target material, favorable printing can be achieved even onto curved surfaces or uneven surfaces with irregular surface forms. As a result, there is a wide range of industrial fields to which ink-jet printing can be applied.

Amongst the different inks used in ink-jet recording systems, those which use a dye as the coloring material can be broadly classified into water-based inks, which use water as the primary solvent, and oil-based inks, which use an organic solvent as the primary solvent, although water-based inks, in which a dye is dissolved in a water-based medium, are more common. However, when conventional water-based dye inks are used in industrial applications, a variety of problems arise, including a slow drying rate for ink applied to non-absorbent materials, weak adhesion of the printed image, and unsatisfactory durability in terms of factors such as the abrasion resistance, the water resistance and the light resistance. One example of inks that are able to largely overcome these problems are the water-based and oil-based ultraviolet curable ink-jet recording inks, which use various pigments as the coloring materials, and undergo curing and drying through exposure to an activated energy ray such as ultraviolet light.

Examples of oil-based ink-jet recording inks that undergo curing and drying through exposure to an activated energy ray such as ultraviolet light include the inks disclosed in the examples of Published Japanese Translation No. 2001-525479 of PCT, which contain carbon black, a dispersant, and a dispersion assistant, wherein the dispersion assistant uses an amine salt of copper phthalocyanine sulfonic acid, and the inks disclosed in Japanese Unexamined Patent Application, First Publication No. 2001-207098, which use a copper phthalocyanine derivative with an introduced functional group such as a phthalimidomethyl group, amino group or triazine group as a pigment dispersant.

However, all of the inks disclosed in Published Japanese Translation No. 2001-525479 of PCT and Japanese Unexamined Patent Application, First Publication No. 2001-207098 use a lipophilic phthalocyanine derivative that can be easily dispersed in the photopolymerizable compound, and consequently the adsorption of the phthalocyanine derivative of the dispersion assistant to the carbon black is prone to desorption, meaning the dispersion stability of the pigment within the photopolymerizable compound is unsatisfactory.

If the dispersion stability is unsatisfactory, then aggregates are more likely to form in the ink, and the adhesion of these types of aggregates around the vicinity of the ink-jet nozzle can prevent the formation of favorable ink droplets at the nozzle, leading to a marked deterioration in the stability of the discharge volume and discharge direction.

Currently, the dispersion stability of ultraviolet curable ink-jet recording inks that use carbon black as the coloring material is not entirely satisfactory, meaning the discharge stability of these inks is also unsatisfactory. Achieving a favorable dispersion stability is particularly difficult in high resolution inks that use carbon black with a small particle size.

DISCLOSURE OF INVENTION

An object of the present invention is to provide an ink composition for ultraviolet curable ink-jet recording, which contains a stable dispersion of carbon black, and provides excellent dispersion stability and discharge stability, as well as a process for producing such an ink composition.

In order to achieve the above object, a first aspect of the present invention is an ink composition for ultraviolet curable ink-jet recording containing carbon black, a photopolymerizable compound and a photopolymerization initiator, comprising at least one selected from the group consisting of non-metallic phthalocyanine sulfonic acids, metal phthalocyanine sulfonic acids in which the central metal is Cu, Fe, Ni, Co, or Ti, and metal salts thereof, and a polymer dispersant containing a basic functional group.

In an ink composition of the composition described above, the non-metallic phthalocyanine sulfonic acid, metal phthalocyanine sulfonic acid in which the central metal is Cu, Fe, Ni, Co, or Ti, or the metal salt thereof, which represents the dispersion assistant, adsorbs to the surface of the carbon black, and the polymer dispersant containing the basic functional group adsorbs strongly via this dispersion assistant, thereby forming a favorable and stable dispersion of the carbon black. In addition, because this dispersion assistant is hydrophilic, it is more resistant to desorption from the carbon black within the photopolymerizable compound than is the case for lipophilic dispersion assistants, which has a significant effect on the dispersion stability of the carbon black.

Furthermore, a second aspect of the present invention is a process for producing an ink composition for ultraviolet curable ink-jet recording comprising a first step for producing a surface treated carbon black in which a dispersion assistant is adsorbed to the surface of the carbon black, wherein at least one selected from the group consisting of non-metallic phthalocyanine sulfonic acids, metal phthalocyanine sulfonic acids in which the central metal is Cu, Fe, Ni, Co, or Ti, and metal salts thereof is used as the dispersion assistant, and that dispersion assistant and the carbon black are mixed together in an aqueous medium, and the resulting mixture is then dried, and a second step for dispersing the surface treated carbon black in a photopolymerizable compound in the presence of a polymer dispersant containing a basic functional group.

By using the dispersion assistant described above, the polymer dispersant is able to adsorb strongly to the carbon black via this dispersion assistant, and the dispersion stabilization effect caused by the resulting steric hindrance causes the carbon black to disperse stably within the photopolymerizable compound.

BEST MODE FOR CARRYING OUT THE INVENTION

As follows is a more detailed description of the present invention, based on a series of embodiments of the invention. In the detailed description below, in the discussion of the metal phthalocyanine sulfonic acids and metal salts thereof according to the present invention, reference to the central metals Cu, Fe, Ni, Co and Ti is omitted.

The three basic characteristics of carbon black are the specific surface area, the structure, and the surface chemical characteristics, and the specific values for these characteristics can be selected in accordance with the intended application. In the case of carbon black for use within ink-jet recording inks, materials with a large BET specific surface area and a small particle size are preferred as they produce the most favorable discharge stability, and carbon black with a BET specific surface area within a range from 200 to 300 $m^2/g$ is ideal. If the BET specific surface area value is less than 200 $m^2/g$, then the particle size is large, and the discharge stability is prone to deterioration. Furthermore, the image concentration also tends to be inferior to that produced with dye based inks. In contrast, if the BET specific surface area exceeds 300 $m^2/g$, then the particle size becomes overly fine, making it difficult to achieve a favorable level of dispersion stability.

Dispersion of carbon black becomes increasingly difficult as the particle size becomes finer, but by using a polymer dispersant and a dispersion assistant described above, even carbon black with a high BET value exceeding 200 $m^2/g$ can be favorably dispersed within a photopolymerizable compound, enabling high resolutions rivaling those of dye based ink-jet recording inks to be achieved.

Furthermore, the structure indicates the state of fusion between particles of carbon black, and is represented numerically by a DBP oil absorption value. Larger DBP oil absorption values indicate longer linkages of particles. The carbon black used in the present invention preferably has a DBP oil absorption value of no more than 100 ml/100 g, and even more preferably a value within a range from 50 to 100 ml/100 g, in order to ensure favorable affinity with the photopolymerizable compound, such as a (meth)acrylate compound, which functions as the dispersion medium, and to ensure favorable adsorption of the non-metallic phthalocyanine sulfonic acid, metal phthalocyanine sulfonic acid or metal salt thereof. If the DBP absorption value exceeds 100 ml/100 g, then the dispersion stability of the carbon black tends to deteriorate.

The chemical characteristics of the surface of the carbon black is represented by the pH value, and acidic carbon blacks of pH 2 to 4, and neutral or basic carbon blacks of pH 7 or greater are mainly used. In terms of ensuring favorable adsorption of the non-metallic phthalocyanine sulfonic acid, metal phthalocyanine sulfonic acid or metal salt thereof of the dispersion assistant, the pH of the carbon black is preferably 7 or greater, and basic carbon blacks with pH values within a range from 7 to 9 are particularly desirable. The quantity of carbon black used is preferably within a range from 2 to 10% by weight of the total ink quantity.

The non-metallic phthalocyanine sulfonic acid, metal phthalocyanine sulfonic acid or metal salt thereof that is used as a dispersion assistant in the present invention is a pigment derivative containing phthalocyanine based organic pigment residues, and can be synthesized by reacting a non-metallic phthalocyanine or a metal phthalocyanine with concentrated sulfuric acid or the like using known methods. Specific examples of metals that can be used in forming metal salts of the non-metallic phthalocyanine sulfonic acids and metal phthalocyanine sulfonic acids include alkali metals such as Li, Na and K, polyvalent metals such as Ca, Ba, Al, Mn, Sr, Mg and Ni, and ammonium salts.

In a metal phthalocyanine of the present invention, 2 hydrogen atoms from the center of the molecular structure of a non-metallic phthalocyanine are substituted with a metal. Suitable examples of the metal include Cu, Fe, Ni, Co and Ti, although Cu is particularly preferred, and copper phthalocyanine sulfonic acid and metals salts of copper phthalocyanine sulfonic acid are ideal.

The non-metallic phthalocyanine sulfonic acid, metal phthalocyanine sulfonic acid or metal salt thereof may be used simply by mixing with the photopolymerizable compound such as a (meth)acrylate, the carbon black, and the polymer dispersant during the dispersion process, although the non-metallic phthalocyanine sulfonic acid, metal phthalocyanine sulfonic acid or metal salt thereof is preferably first mixed with the carbon black in an aqueous medium and subsequently dried, thus adsorbing the dispersion assistant to the carbon black surface and producing a surface treated carbon black. By employing this type of surface treatment process, the hydrophilic dispersion assistant can be adsorbed uniformly across the entire carbon black surface.

The quantity used of the non-metallic phthalocyanine sulfonic acid, metal phthalocyanine sulfonic acid or metal salt thereof is preferably within a range from 2 to 15% by weight, and even more preferably from 4 to 10% by weight, relative to the total weight of carbon black. If the quantity is too low, then the effect of the material as a dispersion assistant may not manifest adequately, whereas if the quantity is too large, excess undissolved components may impair the discharge stability.

In the present invention, an aqueous medium refers to either distilled water or a mixed solution of distilled water and a water soluble organic solvent, and either distilled water, or a mixed solution of distilled water and a lower alcohol such as methanol or ethanol is preferred.

The polymer dispersant used in the present invention contains a basic functional group, and adsorbs to the carbon black via the non-metallic phthalocyanine sulfonic acid, metal phthalocyanine sulfonic acid or metal salt thereof of the dispersion assistant, thereby imparting a favorable level of dispersion stability to the carbon black. Examples of the basic functional group include primary, secondary and tertiary amino groups, and nitrogen-containing hetero rings such as pyridine, pyrimidine and pyrazine. Specific examples of the polymer dispersant include AJISPER PB821, PB822 and PB817, manufactured by Ajinomoto-Fine-Techno Co., Inc., SOLSPERSE 24000GR and 32000, manufactured by Avecia Ltd., and DISPARLON DA-703-50, DA-705 and DA-725, manufactured by Kusumoto Chemicals Ltd, although this is not an exhaustive list. Furthermore, the quantity added of this polymer dispersant is preferably within a range from 10 to 80% by weight, and preferably from 20 to 60% by weight, relative to the pigment. If the quantity added is less than 10% by weight, then the composition is prone to a deterioration in dispersion stability, whereas if the quantity exceeds 80% by weight, then the viscosity of the ink tends to increase, leading to an undesirable deterioration in the discharge stability. If the polymer dispersant does not dissolve, then extension of the polymer chain does not occur, and pigment adsorption sites are not exposed, and consequently, the polymer dispersant is typically used in combination with a solvent in which the polymer dispersant is soluble.

The photopolymerizable compound used in the present invention can be classified as either a radical polymerization type compound or a cationic polymerization type compound depending on its associated reaction mechanism, and known photopolymerizable compounds of either type can be used.

Examples of radical polymerization type photopolymerizable compounds that can be used in the present invention include monofunctional (meth)acrylates and polyfunctional (meth)acrylates, and these can be used either singularly, or in combinations of two or more different compounds.

Specific examples of suitable monofunctional (meth)acrylates include methyl (meth)acrylate, ethyl (meth)acrylate, propyl (meth)acrylate, butyl (meth)acrylate, amyl (meth) acrylate, 2-ethylhexyl (meth)acrylate, octyl (meth)acrylate, nonyl (meth)acrylate, dodecyl (meth)acrylate, hexadecyl (meth)acrylate, octadecyl (meth)acrylate, cyclohexyl (meth) acrylate, benzyl (meth)acrylate, methoxyethyl (meth)acrylate, butoxyethyl (meth)acrylate, phenoxyethyl (meth)acrylate, nonylphenoxyethyl (meth)acrylate, glycidyl (meth) acrylate, dimethylaminoethyl (meth)acrylate, diethylaminoethyl (meth)acrylate, isobornyl (meth)acrylate, dicylopentanyl (meth)acrylate, dicylopentenyl (meth)acrylate, and dicylopentenyloxyethyl (meth)acrylate.

Furthermore, specific examples of suitable polyfunctional (meth)acrylates include the di(meth)acrylates of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecanedimethanol, ethylene glycol, polyethylene glycol, propylene glycol, dipropylene glycol, tripropylene glycol and polypropylene glycol, the di(meth)acrylate of tris(2-hydroxyethyl) isocyanurate, the di(meth)acrylate of a diol obtained by adding at least 4 moles of ethylene oxide or propylene oxide to 1 mol of neopentyl glycol, the di(meth)acrylate of a diol obtained by adding 2 mols of ethylene oxide or propylene oxide to 1 mol of bisphenol A, the di- or tri(meth)acrylate of a triol obtained by adding at least 3 mols of ethylene oxide or propylene oxide to 1 mol of trimethylolpropane, the di(meth)acrylate of a diol obtained by adding at least 4 mols of ethylene oxide or propylene oxide to 1 mol of bisphenol A, as well as trimethylolpropane tri(meth)acrylate, pentaerythritol tri(meth)acrylate, dipentaerythritol poly(meth) acrylates, ethylene oxide-modified phosphoric acid (meth) acrylates, and ethylene oxide-modified alkylphosphoric acid (meth)acrylates.

Examples of representative cationic polymerization type photopolymerizable compounds that can be used in the present invention include epoxy compounds and vinyl ether compounds.

Specific examples of suitable epoxy compounds include aliphatic epoxy compounds such as bisphenol A type epoxy compounds, bisphenol F type epoxy compounds, phenol novolak type epoxy compounds, trimethylolpropane polyglycidyl ether and neopentyl glycol diglycidyl ether, and alicyclic epoxy compounds such as CELLOXIDE 2000, 3000 and 4000, manufactured by Daicel Chemical Industries Ltd.

Specific examples of suitable vinyl ether compounds include 2-hydroxyethyl vinyl ether, triethylene glycol vinyl monoether, tetraethylene glycol divinyl ether and trimethylolpropane trivinyl ether.

The photopolymerizable compound used in the present invention preferably comprises a photopolymerizable compound in which the polymer dispersant is soluble, and in order to ensure favorable dispersion stability, preferably comprises a photopolymerizable compound in which 30% by weight or greater of the polymer dispersant is soluble. By incorporating this type of photopolymerizable compound, a separate non-reactive dilution solvent need not be added to dissolve the polymer dispersant, meaning there is no danger of lowering the curability or the durability of the curable coating.

Amongst the different photopolymerizable compounds in which the polymer dispersant is soluble, specific examples of radical polymerization type photopolymerizable compounds include 2-hydroxy-3-phenoxypropyl (meth)acrylate, tetrafurfuryl (meth)acrylate, neopentyl glycol (meth)acrylate, 2-hydroxyethyl (meth)acrylate, and benzyl (meth)acrylate. Of these, 2-hydroxy-3-phenoxypropyl acrylate is particularly preferred, and this compound is readily available as a commercial product, including "VISCOAT #220" manufactured by Osaka Organic Chemical Industry Ltd., "Epoxy ester M-600A" manufactured by Kyoeisha Chemical Co., Ltd., and "ARONIX M-5700" manufactured by Toagosei Co., Ltd. In the present invention, the generic term (meth) acrylate is used to refer jointly to acrylate and methacrylate. The quantity used of these (meth)acrylates in which the polymer dispersant is soluble is preferably at least equal to the quantity of the polymer dispersant within the ink.

Furthermore, examples of cationic polymerization type photopolymerizable compounds in which the polymer dispersant is soluble include low viscosity alicyclic epoxy compounds, and a specific example is CELLOXIDE 3000.

The use of non-reactive dilution solvents such as water or organic solvents causes deterioration in the durability of the printed product, including factors such as the abrasion resistance, the water resistance and the solvent resistance. However, by employing a photopolymerizable compound that is in which the polymer dispersant is soluble in the manner described above, a black ink composition for ultraviolet curable ink-jet recording can be prepared that contains no substantial levels of non-reactive dilution solvents in ink composition. As a result, no solvent residues remain within the printed product, and no solvent odors arise, meaning the composition is also preferred in terms of the health and environmental impacts.

In the present invention, the term "non-reactive" means lacking in photopolymerization capabilities. Furthermore, the expression "contains no substantial levels of non-reactive dilution solvents" means that the quantity of such solvents is much smaller than the quantity typically used as a dilution solvent for a polymer dispersant, and is a quantity that not only has no effect on the coating strength, the coating curability or the durability of the ink, but is also much lower than the quantity at which human health could be affected. Based on the typical quantities of polymer dispersant used, the quantity of such non-reactive dilution solvents within the ink composition is preferably no more than 0.5% by weight, and even more preferably no more than 0.1% by weight, and most preferably no more than 0.01% by weight.

As described above, in the present invention, both radical polymerization type photopolymerizable compounds and cationic polymerization type photopolymerizable compounds can be used as the photopolymerizable compound. However, in order to produce a low viscosity ink with a rapid cure rate, the use of (meth)acrylate based radical polymerization type photopolymerizable compounds is preferred as the photopolymerizable compound.

Furthermore, in order to provide an ink composition of the present invention with excellent curability, and impart superior durability to the cured coating, the ultraviolet curable composition comprising the radical polymerization type photopolymerizable compound preferably contains a polyurethane (meth)acrylate. It is thought that the reason that ultraviolet curable compositions containing a polyurethane (meth)acrylate exhibit such favorable curability is because compared with the terminal double bonds of a typical (meth)acrylate, the terminal double bonds of a polyurethane (meth)acrylate are more easily cleaved due to the presence of the neighboring urethane linkage. Furthermore, the inherent characteristics of the polyurethane also provide excellent abrasion resistance.

The polyurethane (meth)acrylate used in an ink-jet ink must be either of low viscosity, or must be of a crystalline form or the like, so that even if the viscosity of the polyurethane (meth)acrylate itself is high, it can be easily converted to a low viscosity form through dilution with another (meth)acrylate. Accordingly, polyurethane (meth) acrylates that do not use long chain polyethers, or polyols such as polyesters, but rather are formed by reacting a polyisocyanate and a hydroxy (meth)acrylate, are preferred.

From the viewpoints of the viscosity and curability of the ink-jet ink composition, the quantity of the polyurethane (meth)acrylate is preferably within a range from 3 to 15% by weight relative to the total quantity of the ultraviolet curable composition.

The radical photopolymerization initiator used in the present invention may be any initiator capable of curing the ultraviolet curable composition used in the present invention. Molecular cleavage type initiators and hydrogen extraction type initiators are ideal as the photopolymerization initiator of the present invention.

Specific examples of preferred molecular cleavage type radical photopolymerization initiators that can be used in the present invention include benzoin isobutyl ether, 2,4-diethylthioxanthone, 2-isopropylthioxanthone, benzyl 2,4,6-trimethylbenzoyldiphenylphosphine oxide, 6-trimethylbenzoyldiphenylphosphine oxide, 2-benzyl-2-dimethylamino-1-(4-morpholinophenyl)-butan-1-one, and bis(2,6-dimethoxybenzoyl)-2,4,4-trimethylpentylphosphine oxide. Examples of other molecular cleavage type radical photopolymerization initiators that may be used in combination with the above initiators include 1-hydroxycyclohexyl phenyl ketone, benzoin ethyl ether, benzyl dimethyl ketal, 2-hydroxy-2-methyl-1-phenylpropan-1-one, 1-(4-isopropylphenyl)-2-hydroxy-2-methylpropan-1-one and 2-methyl-1-(4-methylthiophenyl)-2-morpholinopropan-1-one. In addition, a hydrogen extraction type photopolymerization initiator such as benzophenone, 4-phenylbenzophenone, isophthalphenone, and 4-benzoyl-4'-methyl-diphenylsulfide may also be used in combination with the above initiators.

With the above radical photopolymerization initiator, an amine that does not undergo an addition reaction with the above polymerizable component may also be added as a sensitizer, and suitable examples of this amine include trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone. The radical photopolymerization initiator and the sensitizer described above are preferably selected from those materials which display excellent solubility in the ultraviolet curable compound, and which do not inhibit the transmittance of ultraviolet light.

The quantity of the radical photopolymerization initiator and the sensitizer is typically within a range from 0.1 to 20% by weight, and preferably from 4 to 12% by weight, of the total weight of the ultraviolet curable composition.

The cationic photopolymerization initiator used in the present invention may be any initiator capable of curing the ultraviolet curable composition used in the present invention and commonly known. Specific examples include polyarylsulfonium salts such as triphenylsulfonium hexafluoroantimonate and triphenylsulfonium hexafluorophosphate, and polyaryliodonium salts such as diphenyliodonium hexafluoroantimonate and p-nonylphenyliodonium hexafluoroantimonate. These cationic photopolymerization initiators can also be used in combinations of two or more compounds.

The quantity of the cationic photopolymerization initiator is typically within a range from 0.1 to 20% by weight, and preferably from 1 to 10% by weight, of the total weight of the ultraviolet curable composition.

Furthermore, non-reactive resins and other additives can also be added to an ink composition of the present invention, for purposes such as regulating the surface tension, and improving the adhesion of the ink to the printing target material.

An ultraviolet curable ink-jet ink composition of the present invention can be produced by simply combining the carbon black, the polymer dispersant, the dispersion assistant, and the photopolymerizable compound in a single batch, and then conducting a process for dispersing the carbon black within the photopolymerizable compound. However, as described above, the carbon black is preferably first subjected to surface treatment with the dispersion assistant. In other words, first, the carbon black and at least one selected from the group consisting of non-metallic phthalocyanine sulfonic acids, metal phthalocyanine sulfonic acids, and the metal salts thereof, are stirred and mixed together in an aqueous medium, filtered through a Nutsche filter or the like, and then dried to prepare carbon black that has been surface treated with a non-metallic phthalocyanine sulfonic acid, metal phthalocyanine sulfonic acid, or metal salt thereof. Subsequently, a mixture of this surface treated carbon black, the polymer dispersant containing a basic functional group, the photopolymerizable compound such as a (meth)acrylate compound, and where necessary any additional resins, is dispersed using a normal dispersion device such as a beads mill, and the photopolymerization initiator and any other additives such as surface tension regulating agents are then added, stirred, and dissolved. Furthermore, the ink composition could also be produced by first preparing a concentrated pigment dispersion (a mill base) using a normal dispersion device such as a beads mill, and subsequently adding and stirring in the (meth)acrylate photopolymerizable compound containing the dissolved photopolymerization initiator, and any additives and the like.

EXAMPLES

As follows is a more detailed description of the present invention based on a series of examples, although the scope of the present invention is in no way restricted by the examples presented below. In the following examples, the units "parts" refer to parts by weight.

Preparation of Surface Treated Carbon Blacks

Surface Treated Carbon Black Preparatory Example 1

4 parts of copper phthalocyanine sulfonic acid was added to 1000 parts of purified water, and stirred and mixed. To the resulting solution was added 40 parts of #960 (a basic carbon black manufactured by Mitsubishi Chemical Corporation, pH: 8.0, specific surface area: 250 $m^2/g$, DBP oil absorption: 71 ml/100 g), and the resulting mixture was stirred and mixed for 30 minutes, and then filtered through a Nutsche filter. The filtered solid material was then dried for 2 hours at 120° C., yielding a surface treated carbon black.

Surface Treated Carbon Black Preparatory Example 2

4 parts of copper phthalocyanine sulfonic acid was added to 1000 parts of purified water, and stirred and mixed. To the resulting solution was added 40 parts of #970 (an acidic carbon black manufactured by Mitsubishi Chemical Corporation, pH: 3.5, specific surface area: 250 m$^2$/g, DBP oil absorption: 80 ml/100 g), and the resulting mixture was stirred and mixed for 30 minutes, and then filtered through a Nutsche filter. The filtered solid material was then dried for 2 hours at 120° C., yielding a surface treated carbon black.

Surface Treated Carbon Black Preparatory Example 3

4 parts of copper phthalocyanine sulfonic acid was added to 1000 parts of purified water, and stirred and mixed. To the resulting solution was added 40 parts of #990 (a basic carbon black manufactured by Mitsubishi Chemical Corporation, pH: 8.0, specific surface area: 250 m$^2$/g, DBP oil absorption: 113 ml/100 g), and the resulting mixture was stirred and mixed for 30 minutes, and then filtered through a Nutsche filter. The filtered solid material was then dried for 2 hours at 120° C., yielding a surface treated carbon black.

Polyurethane (Meth)Acrylate Synthetic Example

A 1 L four neck flask equipped with a stirrer, a thermometer, a condenser and a dropping funnel was charged with 606.7 g of caprolactone modified hydroxyethyl acrylate (PLACCEL FA-1, manufactured by Daicel Chemical Industries Ltd.), and 227.7 g of tolylene diisocyanate was then added dropwise from the dropping funnel, with constant stirring, and taking due care to ensure that the reaction temperature did not exceed 70° C. Following completion of this dropwise addition, stirring was continued for 1 hour with the reaction temperature held at approximately 70° C., and 0.1 g of dibutyltin dilaurate was then added, and stirring was continued for a further approximately 10 hours. After this period, the reaction mixture was checked to ensure that no unreacted isocyanate groups remained, and the product was then removed from the flask.

Mill Base Preparatory Examples

Mill Base Preparatory Example 1

A mixture of 10 parts of the surface treated carbon black from the preparatory example 1, 6 parts of AJISPER PB821 (a polymer dispersant manufactured by Ajinomoto-Fine-Techno Co., Inc.), 14 parts of ARONIX M5700 (manufactured by Toagosei Co., Ltd.), 63 parts of the ethylene oxide adduct of 1,6-hexandediol diacrylate, and 7 parts of 3-methoxybutyl acrylate was mixed together with a stirrer for 1 hour, and was then treated for 4 hours in a beads mill to prepare a mill base.

Mill Base Preparatory Example 2

A mixture of 10 parts of the surface treated carbon black from the preparatory example 1, 6 parts of SOLSPERSE 24000GR (a polymer dispersant manufactured by Avecia Ltd.), 14 parts of ARONIX M5700 (manufactured by Toagosei Co., Ltd.), 63 parts of the ethylene oxide adduct of 1,6-hexandediol diacrylate, and 7 parts of 3-methoxybutyl acrylate was mixed together with a stirrer for 1 hour, and was then treated for 4 hours in a beads mill to prepare a mill base.

Mill Base Preparatory Example 3

With the exception of replacing the surface treated carbon black used in the mill base of the preparatory example 1 with the surface treated carbon black of the preparatory example 2, a mill base was prepared using the same method as the mill base preparatory example 1.

Mill Base Preparatory Example 4

With the exception of replacing the surface treated carbon black used in the mill base of the preparatory example 1 with the surface treated carbon black of the preparatory example 3, a mill base was prepared using the same method as the mill base preparatory example 1.

Mill Base Comparative Preparatory Example 1

With the exception of replacing the surface treated carbon black used in the mill base of the preparatory example 1 with untreated carbon black #960, a mill base was prepared using the same method as the mill base preparatory example 1.

Mill Base Comparative Preparatory Example 2

With the exception of replacing the surface treated carbon black used in the mill base of the preparatory example 1 with untreated carbon black #970, a mill base was prepared using the same method as the mill base preparatory example 1.

Mill Base Comparative Preparatory Example 3

A mixture of 10 parts of untreated carbon black #960, 1 part of SOLSPERSE 5000 (an amine salt of phthalocyanine sulfonic acid, manufactured by Avecia Ltd.), 6 parts of AJISPER PB821, 14 parts of ARONIX M5700, 63 parts of the ethylene oxide adduct of 1,6-hexandediol diacrylate, and 7 parts of 3-methoxybutyl acrylate was mixed together with a stirrer for 1 hour, and was then treated for 4 hours in a beads mill to prepare a mill base.

Ink Preparatory Examples

Example 1

To a mixture of 4.0 parts of the polyurethane acrylate from the synthetic example, 14.0 parts of the ethylene oxide adduct of trimethylolpropane triacrylate, 39.0 parts of the ethylene oxide adduct of 1,6-hexandediol diacrylate, 8.0 parts of 3-methoxybutyl acrylate, and 0.1 parts of DOW CORNING 57 ADDITIVE (a polyether modified silicone oil, manufactured by Dow Corning Corporation) was added 5.6 parts of CIBA IRGACURE 369 (manufactured by Ciba Specialty Chemicals Inc.) as a photopolymerization initiator, and the mixture was heated to 60° C. to dissolve the photopolymerization initiator. 35 parts of the mill base from the preparatory example 1 was added to the resulting solution and mixed thoroughly, and the mixture was then filtered through a 1.2 μm membrane filter to prepare an ink-jet recording ink.

Example 2

To a mixture of 6.0 parts of the polyurethane acrylate from the synthetic example, 17.0 parts of the ethylene oxide adduct of trimethylolpropane triacrylate, 32.0 parts of dipropylene glycol diacrylate, 10.0 parts of 2-methoxyethyl acrylate, and 0.1 parts of DOW CORNING 57 ADDITIVE were added 4.8 parts of CIBA IRGACURE 819 (manufactured by Ciba Specialty Chemicals Inc.) and 3.2 parts of CIBA DAROCUR 1173 (manufactured by Ciba Specialty Chemicals Inc.) as photopolymerization initiators, and the mixture was heated to 60° C. to dissolve the photopolymerization initiators. 35 parts of the mill base from the preparatory example 2 was added to the resulting solution and mixed thoroughly, and the mixture was then filtered through a 1.2 μm membrane filter to prepare an ink-jet recording ink.

Example 3

With the exception of replacing the mill base of the preparatory example 1 used in the above example 1 with the mill base from the preparatory example 3, an ink-jet recording ink was prepared using the same method as the example 1.

Example 4

With the exception of replacing the mill base of the preparatory example 1 used in the above example 1 with the mill base from the preparatory example 4, an ink-jet recording ink was prepared using the same method as the example 1.

Comparative Example 1

With the exception of replacing the mill base of the preparatory example 1 used in the above example 1 with the mill base from the comparative preparatory example 1, an ink-jet recording ink was prepared using the same method as the example 1.

Comparative Example 2

With the exception of replacing the mill base of the preparatory example 1 used in the above example 1 with the mill base from the comparative preparatory example 2, an ink-jet recording ink was prepared using the same method as the example 1.

Comparative Example 3

With the exception of replacing the mill base of the preparatory example 1 used in the above example 1 with the mill base from the comparative preparatory example 3, an ink-jet recording ink was prepared using the same method as the example 1.

For each of the ink-jet recording inks of the examples 1 to 4 and the comparative examples 1 to 3, the initial dispersibility, the dispersion stability, the discharge characteristics, and the curability were evaluated using the methods described below. The results are shown in Table 1.

Initial Dispersibility

A particle size measurement of the ink-jet recording ink was performed using a MICROTRAC UPA particle analyzer (manufactured by Leeds & Northrup Co., Ltd.).

Dispersion Stability

Using an E-type viscometer, 25° C. viscosity values were measured initially, and then after storage for 14 days at 60° C., and after storage for 30 days at 60° C., and the change of viscosity was used to evaluate the dispersion stability. The evaluation was based on the following three levels.

○: The change of viscosity after 30 days storage at 60° C. was within 10% of the initial viscosity value.

Δ: The change of viscosity after 14 days storage at 60° C. was within 10% of the initial viscosity value, but the change of viscosity after 30 days storage at 60° C. exceeded 10% of the initial viscosity value.

x: The change of viscosity after 14 days storage at 60° C. exceeded 10% of the initial viscosity value.

Discharge Characteristics

Printing was conducted using an ink-jet printer with piezo print heads, with the head temperature held at 45° C., and the state of the printing on the target was then evaluated visually, based on the following two levels.

○: Printing was possible at predetermined positions.

x: Either ink discharge did not occur, or the state of the discharge was very unstable, leading to considerable disturbance of the printed image.

Curability: Methanol Rubbing Evaluation

A printed glass substrate was irradiated with ultraviolet light using a conveyor type ultraviolet irradiation apparatus, under conditions including a 120 W/cm metal halide lamp, and an exposure of 0.5 J/cm$^2$, and the state of curing of the printed film was then evaluated using methanol rubbing.

Methanol rubbing: a methanol soaked cotton swab was pressed against the printed target, and was then rubbed back and forth across the target, and the number of rubbing repetitions of the cotton swab required for the printed film to reach failure, either through peeling or significant thinning, was counted.

TABLE 1

| | Initial dispersibility Volumetric average particle size (nm) | Dispersion stability Viscosity (25° C.) mPa · s | | | | Discharge stability | | |
|---|---|---|---|---|---|---|---|---|
| | | initial | after 14 days at 60° C. | after 30 days at 60° C. | Stability | initial | after 14 days at 60° C. | Curability |
| Example 1 | 87 | 25.9 | 25.5 | 26.3 | ○ | ○ | ○ | at least 50 repetitions |
| Example 2 | 87 | 19.4 | 19.3 | 19.6 | ○ | ○ | ○ | at least 50 repetitions |
| Example 3 | 104 | 26.1 | 27.8 | 33.9 | Δ | ○ | ○ | at least 50 repetitions |
| Example 4 | 125 | 27.4 | 29.0 | 30.3 | Δ | ○ | ○ | at least 50 repetitions |
| Comparative example 1 | 123 | 31.0 | 70.1 | — | x | ○ | x | at least 50 repetitions |
| Comparative example 2 | 90 | 27.8 | 44.7 | — | x | ○ | x | at least 50 repetitions |
| Comparative example 3 | 103 | 26.6 | 33.5 | — | x | ○ | x | at least 50 repetitions |

In each of the comparative examples 1, 2 and 3, because the viscosity increase after 14 days at 60° C. was already remarkable, a viscosity measurement was not conducted after 30 days at 60° C.

As shown above, the inks of the examples 1 and 2 displayed good levels of initial dispersibility, discharge characteristics, dispersion stability (change of viscosity) and curability, whereas the inks of the comparative examples 1, 2 and 3, which contained no non-metallic phthalocyanine sulfonic acid, metal phthalocyanine sulfonic acid or metal salt thereof, displayed poor dispersion stability, and poor ink discharge characteristics after 14 days storage at 60° C. Furthermore, the example 3, which used an acidic carbon black with a pH of 3.5, and the example 4, which used a basic carbon black with a DBP oil absorption value of 113 ml/100 g, were unable to reproduce the superior dispersion stability results of the example 1 and the example 2.

While preferred embodiments of the invention have been described above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

A black ink composition for ultraviolet curable ink-jet recording according to the present invention displays superior levels of initial dispersibility, dispersion stability, discharge characteristics, and curability, and is ideal for printing onto all manner of printing materials.

The invention claimed is:

1. An ink composition for ultraviolet curable ink-jet recording containing carbon black, a photopolymerizable compound, and a photopolymerization initiator, comprising:
    a polymer dispersant containing a basic functional group; and
    a phthalocyanine sulfonic acid compound,
    wherein said phthalocyanine sulfonic acid compound is at least one selected from the group consisting of non-metallic phthalocyanine sulfonic acids; metal phthalocyanine sulfonic acids in which a central metal is Cu, Fe, Ni, Co, or Ti; and metal salts thereof.

2. An ink composition for ultraviolet curable ink-jet recording according to claim 1, wherein said carbon black has been surface treated with at least one selected from the group consisting of non-metallic phthalocyanine sulfonic acids; metal phthalocyanine sulfonic acids in which a central metal is Cu, Fe, Ni, Co, or Ti; and metal salts thereof.

3. An ink composition for ultraviolet curable ink-jet recording according to claim 2, wherein a BET specific surface area of said carbon black is within a range from 200 to 300 $m^2/g$.

4. An ink composition for ultraviolet curable ink-jet recording according to claim 3, wherein said carbon black has a pH of at least 7.

5. An ink composition for ultraviolet curable ink-jet recording according to claim 4, wherein a DBP oil absorption value for said carbon black is no more than 100 ml/100 g.

6. An ink composition for ultraviolet curable ink-jet recording according to claim 1, wherein said polymer dispersant is soluble in said photopolymerizable compound.

7. An ink composition for ultraviolet curable ink-jet recording according to claim 1, wherein said polymer dispersant is soluble in (meth)acrylate.

8. An ink composition for ultraviolet curable ink-jet recording according to claim 7, wherein said (meth)acrylate in which said polymer dispersant is soluble is 2-hydroxy-3-phenoxypropyl acrylate.

9. An ink composition for ultraviolet curable ink-jet recording according to any one of claim 6 through claim 8, which contains no substantial levels of non-reactive dilution solvent.

10. An ink composition for ultraviolet curable ink-jet recording according to claim 9, comprising a polyurethane (meth)acrylate.

11. An ink composition for ultraviolet curable ink-jet recording according to claim 10, wherein said polyurethane (meth)acrylate is obtained by reacting a polyisocyanate and a hydroxy (meth)acrylate.

12. A process for producing an ink composition for ultraviolet curable ink-jet recording comprising:
    a first step for producing a surface treated carbon black in which a dispersion assistant is adsorbed to the carbon black surface, wherein at least one selected from the group consisting of non-metallic phthalocyanine sulfonic acids; metal phthalocyanine sulfonic acids in which a central metal is Cu, Fe, Ni, Co, or Ti, and metal salts thereof, is used as said dispersion assistant, and said dispersion assistant and said carbon black are mixed together in an aqueous medium, and the resulting mixture is then dried, and
    a second step for dispersing the surface treated carbon black in a photopolymerizable compound in the presence of a polymer dispersant containing a basic functional group.

* * * * *